(12) United States Patent  
Pavlovic et al.

(10) Patent No.: US 11,665,067 B2
(45) Date of Patent: May 30, 2023

(54) MANAGING RECONFIGURATIONS OF DISTRIBUTED COMPUTING SYSTEMS

(71) Applicant: International Business Machines Corporation, Armonk, NY (US)

(72) Inventors: Matej Pavlovic, Adliswil (CH); Chrysoula Stathakopoulou, Zurich (CH); Selma Steinhoff, Bülach (CH); Marko Vukolić, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 17/303,479

(22) Filed: May 28, 2021

(65) Prior Publication Data

US 2022/0385549 A1 Dec. 1, 2022

(51) Int. Cl.
*H04L 41/5025* (2022.01)
*H04L 41/042* (2022.01)
*H04L 41/0816* (2022.01)

(52) U.S. Cl.
CPC ........ *H04L 41/5025* (2013.01); *H04L 41/042* (2013.01); *H04L 41/0816* (2013.01)

(58) Field of Classification Search
None
See application file for complete search history.

(56) References Cited

U.S. PATENT DOCUMENTS

| 6,671,821 | B1 | 12/2003 | Castro |
| 8,230,253 | B2 | 7/2012 | Butterworth |
| 2002/0129087 | A1 | 9/2002 | Cachin |
| 2018/0219946 | A1 | 8/2018 | Farrahi Moghaddam |
| 2019/0020629 | A1 | 1/2019 | Baird, III |
| 2019/0273610 | A1 | 9/2019 | Fan |
| 2020/0074440 | A1 | 3/2020 | Fullman |
| 2020/0351111 | A1 | 11/2020 | Lucco |
| 2020/0379852 | A1 | 12/2020 | Yang |
| 2021/0014042 | A1 | 1/2021 | Sivathanu |

(Continued)

OTHER PUBLICATIONS

Correia, et al., "From Consensus to Atomic Broadcast: Time-Free Byzantine-Resistant Protocols without Signatures", The Computer Journal, vol. 49, No. 1, Jan. 2006, pp. 82-96, <https://www.researchgate.net/publication/220459271_From_Consensus_to_Atomic_Broadcast_Time-Free_Byzantine-Resistant_Protocols_without_Signatures>.

(Continued)

*Primary Examiner* — Brian Whipple
(74) *Attorney, Agent, or Firm* — Michael A. Petrocelli

(57) ABSTRACT

A computer manages reconfigurations of a Byzantine fault-tolerant, distributed computing system comprising a network of first nodes adhering to a given consensus protocol at a reconfiguration service. The computer services the network by receiving a request of change of status of a second node with respect to the network. The computer informs at least a subset of the first nodes of the received request. The computer obtains an approval of the request, whereby at least a subset of the first nodes collectively approve the change of status as a result of contributions processed according to the given consensus protocol. The computer updates a configuration log according to request approvals obtained by servicing the network. The computer addresses requests of clients about configurations of the network based on the updated configuration log.

20 Claims, 6 Drawing Sheets

(56) References Cited

U.S. PATENT DOCUMENTS

| | | | |
|---|---|---|---|
| 2021/0073075 A1 | 3/2021 | Zhuo | |
| 2022/0058549 A1* | 2/2022 | Cutts | G06Q 20/401 |

OTHER PUBLICATIONS

Li, et al., "SAREK: Optimistic Parallel Ordering in Byzantine Fault Tolerance", 2016 12th European Dependable Computing Conference, Sep. 5-9, 2016, pp. 77-88, <https://ieeexplore.ieee.org/document/7780347>.

Sousa, et al., "A Byzantine Fault-Tolerant Ordering Service for the Hyperiedger Fabric Blockchain Platform", 2018 48th Annual IEEE/IFIP International Conference on Dependable Systems and Networks, Jun. 25-28, 2018, pp. 51-58, <https://ieeexplore.ieee.org/document/8416470>.

Abid, Muhammad Zeeshan, "A Multi-leader Approach to Byzantine Fault Tolerance", Master of Science Thesis, KTH Royal Institute of Technology, Stockholm, Sweden, Jul. 1, 2015, 115 pages, <http://www.diva-portal.se/smash/get/diva2:838919/FULLTEXT01.pdf>.

Abraham, et al., "Solida: A Blockchain Protocol Based on Reconfigurable Byzantine Consensus", arXiv:1612.02916v2, Nov. 18, 2017, 17 pages.

Aguilera, et al., "Reconfiguring Replicated Atomic Storage: A Tutorial", Bulletin of the EATCS, No. 102, Oct. 2010, pp. 84-108.

Androulaki, et al., "Hyperiedger Fabric: A Distributed Operating System for Permissioned Blockchains", EuroSys 18: Proceedings of the Thirteenth EuroSys Conference, Apr. 2018, Article No. 30, 15 pages, <https://dl.acm.org/doi/10.1145/3190508.3190538>.

Avarikioti, et al., "FnF-BFT: Exploring Performance Limits of BFT Protocols", arXiv:2009.02235v1, Sep. 4, 2020, 15 pages, <https://arxiv.org/pdf/2009.02235.pdf>.

Azouvi, et al., "Winkle: Foiling Long-Range Attacks in Proof-of-Stake Systems", © 2020 Association for Computing Machinery, New-York '20, Oct. 21-23, 2020, New-York, NY, pp. 189-201.

Cachin, et al., "Introduction to Reliable and Secure Distributed Programming", Springer Publishing Company, Feb. 2011, Abstract Only, 1 page, <https://dl.acm.org/doi/book/10.5555/1972495>.

Cachin, et al., "Secure and Efficient Asynchronous Broadcast Protocols", Cryptology ePrint Archive: Report 2001/006, Mar. 7, 2001, 49 pages, <https://eprint.iacr.org/2001/006>.

Castro, et al., "Practical Byzantine Fault Tolerance and Proactive Recovery", ACM Transactions on Computer Systems, vol. 20, No. 4, Nov. 2002, pp. 398-461.

Coelho, et al., "Byzantine Fault-Tolerant Atomic Multicast", 48th Annual IEEE/IFIP International Conference on Dependable Systems and Networks (DSN), 2018, 12 pages, <https://ieeexplore.ieee.org/document/8416469>.

Crain, et al., "DBFT: Efficient Leaderless Byzantine Consensus and its Application to Blockchains", 2018 IEEE 17th International Symposium on Network Computing and Applications (NCA), 8 pages, <https://ieeexplore.ieee.org/document/8548057>.

Deirmenizoglou, et al., "A Survey on Long-Range Attacks for Proof of Stake Protocols", IEEE Access, vol. 7, 2019, pp. 28712-28725, <https://ieeexplore.ieee.org/document/8653269>.

Dolev, et al., "Bounds on information exchange for Byzantine agreement", Journal of the ACM, Jan. 1985, p. 132-140, <https://www.researchgate.net/publication/220431204_Bounds_on_Information_Exchange_for_Byzantine_Agreement>.

Duan, et al., "BChain: Byzantine Replication with High Throughput and Embedded Reconfiguration", UC Davis Previously Published Works, 2014, 16 pages, <https://escholarship.org/uc/item/5ht7n9d4>.

Duan, et al., "BEAT: Asynchronous BFT Made Practical", CCS '18: Proceedings of the 2018 ACM SIGSAC Conference on Computer and Communications Security, Oct. 2018, pp. 2028-2041, <https://dl.acm.org/doi/10.1145/3243734.3243812>.

Duan, et al., "Secure Causal Atomic Broadcast, Revisited", In 47th Annual IEEE/IFIP International Conference on Dependable Systems and Networks, DSN 2017, 12 pages.

Gupta, et al., "RCC: Resilient Concurrent Consensus for High-Throughput Secure Transaction Processing", arXiv:1911.00837v2, Nov. 2, 2020, 13 pages, <https://arxiv.org/abs/1911.00837>.

Kuznetsov, et al., "Asynchronous Reconfiguration with Byzantine Failures", arXiv:2005.13499v2, Aug. 12, 2020, 37 pages, <https://drops.dagstuhl.de/opus/volltexte/2020/13105/>.

Lamport, et al., "The Byzantine generals problem", ACM Transactions on Programming Languages and Systems, Jul. 1982, pp. 382-401, <https://dl.acm.org/doi/10.1145/357172.357176>.

List of IBM Patents or Patent Applications Treated as Related. Filed Herewith. 2 pages.

Liu, et al., "Scalable Byzantine Consensus via Hardware-assisted Secret Sharing", IEEE Transactions on Computers, vol. 68, Issue: 1, Jul. 25, 2018, 15 pages, <https://ieeexplore.ieee.org/document/8419336>.

Madsen, et al., "Transforming Byzantine Faults using a Trusted Execution Environment", 2019 European Dependable Computing Conference (EDCC), pp. 63-70, <https://ieeexplore.ieee.org/abstract/document/8893314>.

Markham, Jerry, "Front-Running'—Insider Trading Under the Commodity Exchange Act", Catholic University Law Review, 1988, vol. 38:69, pp. 69-127.

Mell, et al., "The NIST Definition of Cloud Computing", National Institute of Standards and Technology, Special Publication 800-145, Sep. 2011, 7 pages.

Milosevic, et al., "Bounded Delay in Byzantine Tolerant State Machine Replication", Proceedings of the IEEE Symposium on Reliable Distributed Systems, Sep. 2013, 15 pages.

Moser, et al., "Byzantine-Resistant Total Ordering Algorithms", Information and Computation, vol. 150, Issue 1, Apr. 10, 1999, pp. 75-111, <https://www.sciencedirect.com/science/article/pii/S0890540198927705>.

Pavlovic, et al., "Scalable Leader-Based Total Order Broadcast Protocol for Distributed Computing Systems", U.S. Appl. No. 17/303,477, filed May 28, 2021.

Poke, et al., "AllConcur: Leaderless Concurrent Atomic Broadcast (Extended Version)", arXiv:1608.05866v2, Apr. 21, 2017, 18 pages, <https://arxiv.org/pdf/1608.05866.pdf>.

Reiter, et al., "How to securely replicate services", ACM Transactions on Programming Languages and Systems (TOPLAS), vol. 16, Issue 3, May 1994, pp. 986-1009, <https://dl.acm.org/doi/10.1145/177492.177745>.

Soriente, et al., "ReplicaTEE: Enabling Seamless Replication of SGX Enclaves in the Cloud", 2019 IEEE European Symposium on Security and Privacy (EuroS&P), pp. 158-171, <https://ieeexplore.ieee.org/document/8806748>.

Spenger, Jonas, "Using Blockchain for Tamper-Proof Broadcast Protocols", Master's Thesis, Humboldt University of Berlin, May 2020, 91 pages, <https://opus4.kobv.de/opus4-zib/frontdoor/index/index/docId/7916>.

Stathakopoulou, et al., "Causal Total Order Broadcast Protocols Using Trusted Execution Environments", U.S. Appl. No. 17/303,478, filed May 28, 2021.

Stathakopoulou, et al., "Mir-BFT: High-Throughput BFT for Blockchains", arXiv:1906.05552v2, Sep. 24, 2019, 18 pages, <https://arxiv.org/abs/1906.05552>.

Stathakopoulou, et al., "Mir-BFT: High-Throughput Robust BFT for Decentralized Networks", arXiv:1906.055523, Jan. 22, 2021, 27 pages, <https://arxiv.org/abs/1906.05552>.

Steffenel, Luiz Angelo, "Fast and Scalable Total Order Broadcast for Wide-area Networks", HAL, 2006, 31 pages, <https://hal.inria.fr/inria-00116895v1/document>.

Steinhoff, Selma, "Secure Dynamic Reconfiguration for Byzantine Fault-Tolerant Distributed Systems", Master Thesis, IBM Research, Zurich, and System Security Group Institute of Information Security, Department of Computer Science, ETH Zurich, Sep. 2, 2020, 50 pages.

Vizier, et al., "ComChain: A blockchain with Byzantine fault-tolerant reconfiguration", Concurrency Computation Practice and Experience, Special Issue Paper, Oct. 23, 2019, 19 pages, <https://onlinelibrary.wiley.com/doi/abs/10.1002/cpe.5494>.

Wang, et al,. "LgTTBFT :Effective Byzantine Fault Tolerance Algorithm Based on Structured Network and Trusted Execution

(56) References Cited

OTHER PUBLICATIONS

Environment", EasyChair Preprint, No. 1713, Oct. 18, 2019, 15 pages, <https://easychair.org/publications/preprint/8sSP>.

Yadav, et al., "Formal Specifications and Verification of Message Ordering Properties in a Broadcasting System using Event B", University of Southampton, Southampton, United Kingdom, May 2007, 45 pages, <https://www.researchgate.net/publication/39995145_Formal_Specifications_and_Verification_of_Message_Ordering_Properties_in_a_Broadcasting_System_using_Event_B>.

Yin, et al., "HotStuff: BFT Consensus with Linearity and Responsiveness", Proceedings of the 2019 ACM Symposium on Principles of Distributed Computing, Jul. 2019, pp. 347-356, <https://www.researchgate.net/publication/334577305_HotStuff_BFT_Consensus_with_Linearity_and_Responsiveness>.

\* cited by examiner

MANAGING RECONFIGURATIONS OF DISTRIBUTED COMPUTING SYSTEMS

STATEMENT REGARDING FEDERALLY SPONSORED RESEARCH OR DEVELOPMENT

The project leading to this application has received funding from the European Union's Horizon 2020 research and innovation programme under grant agreement No 780477.

BACKGROUND

The invention relates in general to the field of methods and computer program products for managing configurations of a distributed computing system such as a permissioned blockchain system. In particular, it is directed to methods relying on an external reconfiguration service, which is preferably run as a smart contract executing on a distributed system using a consensus protocol that differs from the consensus protocol used by the managed system.

Blockchain systems are conceived as long-lived systems, which are typically implemented by a set of nodes (also called miners or validators), which participate in a consensus on the system state. More lightweight client nodes (e.g., wallets) occasionally access the blockchain nodes, e.g., when a client wishes to submit an operation to the blockchain. In a long-lived system, this leads to security challenges.

SUMMARY

In an embodiment, a method of managing reconfigurations of a Byzantine fault-tolerant, distributed computing system comprising a network of first nodes adhering to a given consensus protocol at a reconfiguration service includes a computer managing reconfigurations of a Byzantine fault-tolerant, distributed computing system comprising a network of first nodes adhering to a given consensus protocol at a reconfiguration service. The computer services the network by receiving a request of change of status of a second node with respect to the network. The computer informs at least a subset of the first nodes of the received request. The computer obtains an approval of the request, whereby at least a subset of the first nodes collectively approve the change of status as a result of contributions processed according to the given consensus protocol. The computer updates a configuration log according to request approvals obtained by servicing the network. The computer addresses requests of clients about configurations of the network based on the updated configuration log. According to aspects of the invention, the reconfiguration service is implemented at one of the distributed computing system and a distinct distributed computing system and adheres to a further consensus protocol that is logically distinct from the given consensus protocol. According to aspects of the invention, the reconfiguration service is implemented as a smart contract executed according to the further consensus protocol. According to aspects of the invention, the reconfiguration service is implemented at a distinct distributed computing system. According to aspects of the invention, the further consensus protocol uses a proof of work mechanism. According to aspects of the invention, the consensus protocol given at servicing the network uses a proof of stake mechanism, and the approval is obtained by the reconfiguration service based on those contributions from a subset of the first nodes having stakes in respect of the request of change of status. According to aspects of the invention, the distributed system is configured as a permissioned blockchain. According to aspects of the invention, at servicing the network, the first nodes are informed by the reconfiguration service of the received request during a same epoch, so as to be able to make the contributions at an end of that same epoch; and the approval of the request is obtained by the reconfiguration service at the earliest at the end of that same epoch. According to aspects of the invention, at servicing the network, the approval of the request is obtained at the reconfiguration service by validating the request when a sufficient number of the contributions are available to the reconfiguration service. According to aspects of the invention, at each of the first nodes, the computer batches successive ones of their contributions in respect of successive requests of change of status as informed of by the reconfiguration service while servicing the network. According to aspects of the invention, servicing the network further includes informing the first nodes of a configurational change of the network reflecting the approved change of status. According to aspects of the invention, the method further includes, at the second node, obtaining a confirmation from the first nodes that they have been informed of the request of change of status; and confirming the request to the first nodes for the latter to start making the contributions based on the confirmed request. According to aspects of the invention, the method further includes obtaining the approval of the request at the second node, in addition to obtaining this approval at the reconfiguration service, for the second node to start acting with respect to the network according to the approved request. According to aspects of the invention, the method further includes, at the second node, sending the request of change of status to both the reconfiguration service and the first nodes, for the reconfiguration service to accordingly inform the first nodes and the first nodes to confirm they have been informed of the request and then start making the contributions. According to aspects of the invention, the method further includes, at the reconfiguration service, requesting the second node to provision credits for the reconfiguration service to compensate the first nodes according to a protocol run at the reconfiguration service. According to aspects of the invention, a configuration of the reconfiguration service is managed by a further configuration service. According to aspects of the invention, the received request is one of a request to join the network, a request to leave the network, and a request to evict one or more of the nodes of the network. According to aspects of the invention, the network comprises n nodes, n≥4, and the distributed computing system is configured to tolerate at most f Byzantine nodes, where f<n/3.

In another embodiment, a system of managing reconfigurations of a Byzantine fault-tolerant, distributed computing system comprising a network of first nodes adhering to a given consensus protocol at a reconfiguration service, includes a computer system comprising a computer readable storage medium having program instructions embodied therewith, the program instructions executable by a computer to cause the computer to: service the network by receiving a request of change of status of a second node with respect to the network, informing at least a subset of the first nodes of the received request, and obtaining an approval of the request, whereby at least a subset of the first nodes collectively approve the change of status as a result of contributions processed according to the given consensus protocol; updating a configuration log according to request approvals obtained by servicing the network; and addressing requests of clients about configurations of the network based on the updated configuration log.

In another embodiment, A computer program product for managing reconfigurations of a Byzantine fault-tolerant, distributed computing system comprising a network of first nodes adhering to a given consensus protocol, the computer program product comprising a computer readable storage medium having program instructions embodied therewith, the program instructions executable by one or more processors, to cause the reconfiguration service to: service the network by receiving a request of change of status of a second node with respect to the network, informing at least a subset of the first nodes of the received request, and obtaining an approval of the request, whereby at least a subset of the first nodes collectively approve the change of status as a result of contributions processed according to the given consensus protocol; update a configuration log according to request approvals obtained by continually servicing the network; and address requests of clients about configurations of the network based on the updated configuration log.

According to a first aspect, the present invention is embodied as a method of managing reconfigurations of a Byzantine fault-tolerant (BFT), distributed computing system. The system includes a network of first nodes, which adhere to a given consensus protocol. The method includes a series of steps, which are performed at a reconfiguration service. Namely, the reconfiguration service continually services the network and accordingly update a configuration log. This way, the reconfiguration service may continually address requests of clients about configurations of the network, based on the updated configuration log. The reconfiguration service continually services the network by performing the following steps. Upon receiving a request of change of status of a second node with respect to the network, the reconfiguration service informs at least a subset of the first nodes of the received request. In turn, the reconfiguration service obtains an approval of the request, whereby at least a subset of the first nodes collectively approve the change of status as a result of contributions processed according to the given consensus protocol. Accordingly, the reconfiguration service can continually update the configuration log according to request approvals obtained by servicing the network. This way, the reconfiguration service can securely address client requests requiring accurate knowledge about recent configurations of the network.

The reconfiguration service is advantageously implemented at a distributed computing system (preferably distinct from the distributed computing system formed by the network of the first nodes) and adheres to a further consensus protocol that is logically distinct from the consensus protocol used by this network. The reconfiguration service may notably be implemented as a smart contract executed according to this further consensus protocol, e.g., relying on a proof of work mechanism. By contrast, the consensus protocol of the client network typically relies on a proof of stake mechanism. The client distributed computing system may notably be configured as a permissioned blockchain.

According to another aspect, the invention is embodied as a computer program product for managing reconfigurations of a BFT, distributed computing system comprising a network as described above. The computer program product comprises a computer readable storage medium having program instructions embodied therewith, where the program instructions are executable by one or more processors, to cause the reconfiguration service to perform steps according to the above method.

Aspects of the present invention recognize and address concerns regarding system state for a client rejoining a system after being disconnected.

Aspects of the invention, recognize and address issues that arise when the blockchain system initially includes (configuration $C_0$) nodes A, B, C, and D, and then comes to gradually reconfigure to a configuration $C_k$, k>0, in which the system now includes nodes E, F, G, and H but does not include any of the initial nodes of $C_0$ in this example. Aspects of the present invention note that a client that only occasionally reconnects to the blockchain system may not have been updated about the changes in the system membership. Aspects of the present invention note that this client may reconnect to an initial configuration, e.g., $C_0$, which might have been entirely corrupted by a malicious actor, it being noted that realistic blockchain systems limit assumptions on the power of adversaries only with respect to their current configuration. Aspects of the present invention note that may affects many blockchain systems, whether based on Proof-of-Work (PoW), Proof-of-Stake (PoS), or permissioned consensus protocols.

Aspects of the present invention note that in PoS blockchains, an adversary may mount a long-range attack fabricating a blockchain history, which the client cannot distinguish from the real history. Aspects of the present invention note that a similar attack is known in permissioned blockchains and Byzantine fault-tolerant (BFT) systems as the "I still work here" attack.

Aspects of the present invention note that situations may potentially affect PoW blockchains as well, these can rely on the longest chain selection rule. This, together with ever growing miner hashing power in established networks such as those used by cryptocurrencies, allows the nodes of the current configuration to (eventually) convince the client of their legitimacy, a security feature that is of advantage over PoS and permissioned blockchain systems.

Aspects of the present invention note that in PoS systems, long-range attacks are, typically, partially addressed by making validators bond their stakes for a very long time (stake unbonding or "thawing" time, which is often several weeks or more) with slashing mechanisms to discourage adversarial behavior. In other approaches, clients periodically synchronize with changes in the membership set. Permissioned blockchains typically reconfigure internally and are vulnerable to this type of attacks.

Aspects of the present invention recognize that approaches are needed to improve security on distributed computing systems such as permissioned blockchains and PoS systems.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Computerized methods and computer program products embodying the present invention will now be described, by way of non-limiting examples.

DETAILED DESCRIPTION OF EMBODIMENTS OF THE INVENTION

The following description is structured as follows. First, general embodiments and high-level variants are described in section 1. Section 2 describes particularly preferred embodiments (it notably includes a detailed description of FIGS. 2 and 3), while Section 3 is directed to technical implementation details. Note, the present method and its variants are collectively referred to as the "present methods". All references Sn refer to methods steps of the sequence diagrams of FIGS. 2 and 3, while numeral references pertain to physical parts or components of the systems shown in FIG. 1 and the computerized unit shown in FIG. 4.

1. General Embodiments and High-Level Variants

Figure 1:
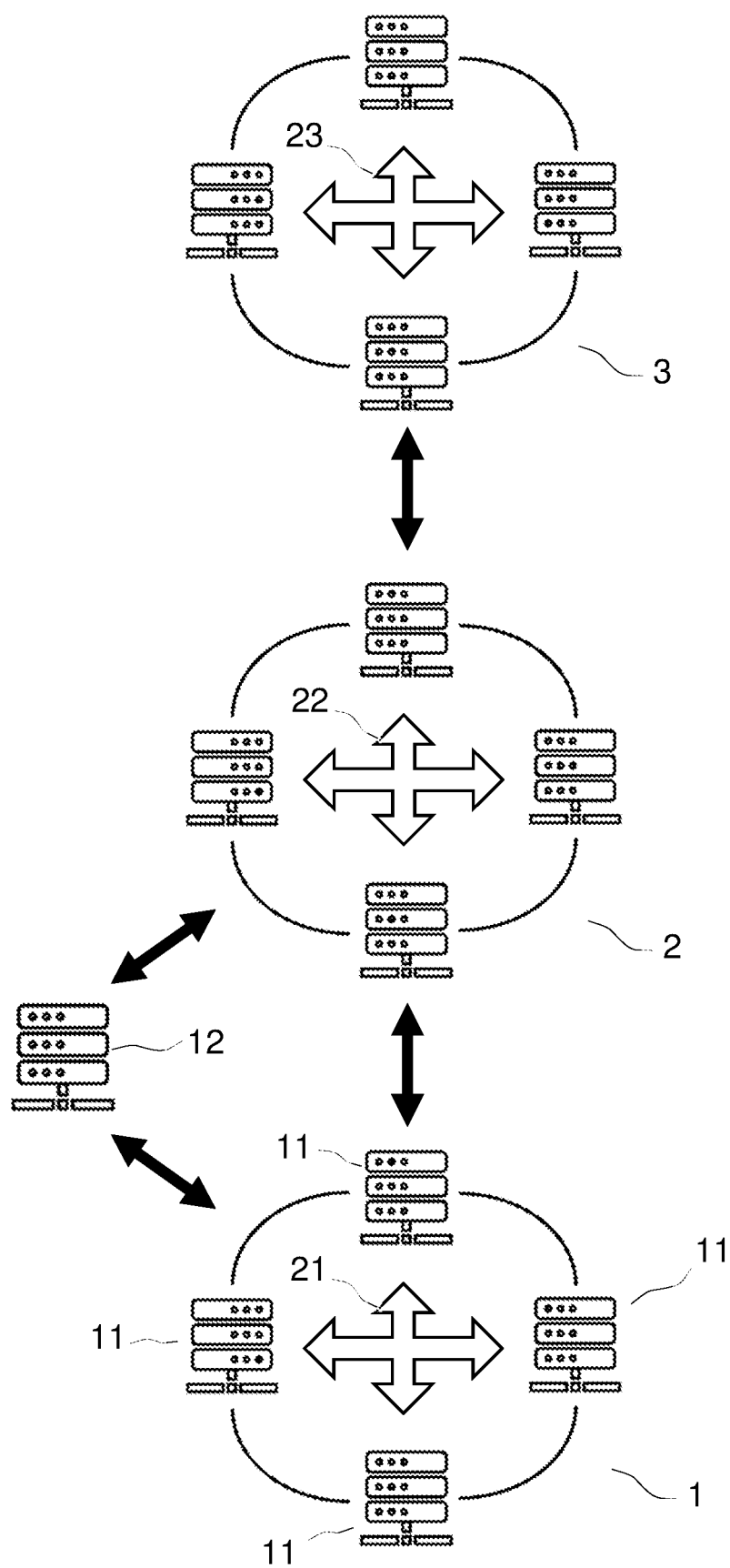
FIG. 1 is a diagram showing distributed computing systems interacting with each other, as in embodiments. In this example, the configuration of a client system is managed by a reconfiguration service, the configuration of which is managed by a further distributed system.
Figure 2:
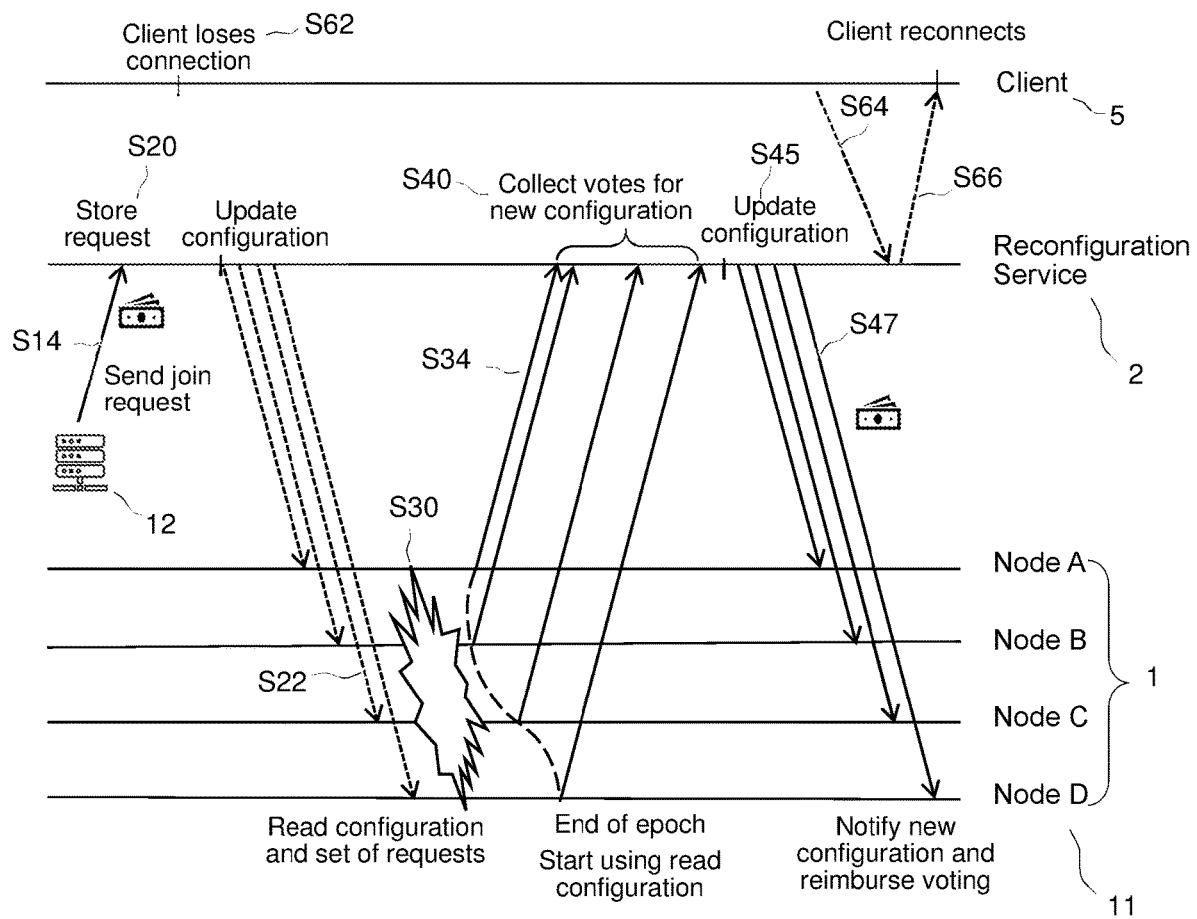
FIG. 2 is a sequence diagram of high-level steps of methods of managing configurations of a distributed computing system, according to an embodiment of the present invention including steps, whereby the reconfiguration service addresses requests of a client process willing to reconnect to the managed system.
Figure 3:
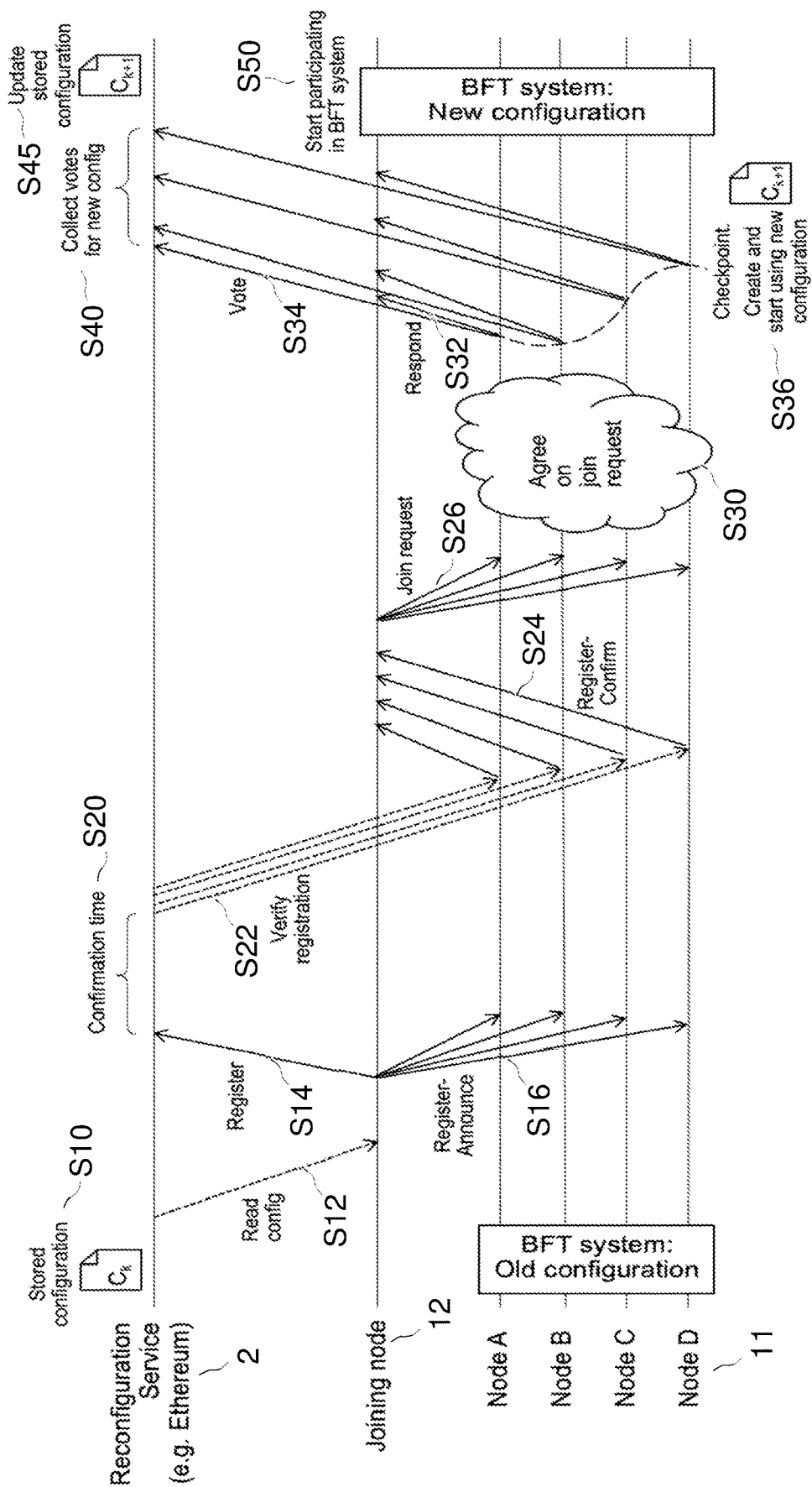
FIG. 3 is a sequence diagram of high-level steps of methods of managing configurations of a distributed computing system, according to an embodiment of the present invention.

In reference to FIGS. 1-3, an aspect of the invention is first described, which concerns a method of managing reconfigurations of a distributed computing system 1, which is a Byzantine fault-tolerant (BFT) system.

As illustrated in FIG. 1, the distributed computing system 1 comprises a network of nodes 11, hereafter referred to as "first nodes". The first nodes 11 are assumed to adhere to a given consensus protocol 21 of the system 1. The system 1 is enabled by physical machines 11 of the network, which runs a distributed computing method, as known by those of skill in this field. In the following, the same numeral reference ("1") is used to designate both the system 1 and/or the underlying network. The network includes n nodes 11. This number is not necessarily constant, since the configuration of the system can be dynamically changed. However, n is typically assumed to be equal to or larger than four, i.e., $n \geq 4$. In practice, the distributed system 1 is typically configured to tolerate at most f Byzantine nodes, where $f < n/3$. That is, at most f nodes in the network 1 can be Byzantine (i.e., fail in some way), such that $n \geq 3f+1$.

The method further involves a reconfiguration service 2, which may be regarded as a server, while the managed system 1 may be regarded as a client of the service 2. The reconfiguration service 2 continually services the network 1, by repeatedly and frequently performing steps as described below. Servicing the network 1 causes the reconfiguration service to continually update a configuration log, in which current configurations of the network (or updates to such configurations) are stored. This way, the reconfiguration service may continually address S66 requests made S64 by external clients 5 (see FIG. 2), where such requests require correct knowledge of current configurations of the network 1. These requests are typically addressed S66 by providing data derived from the configuration log to such clients or by allowing such clients to access the configuration log, upon request S64 of such clients 5. Any of the client processes may potentially be Byzantine.

The reconfiguration service 2 services the network 1 as follows. In operation, the reconfiguration service 2 may continually receive requests of change of status of certain nodes 12, hereafter referred to as "second nodes". Such requests may be made by the second nodes 12 themselves or by other nodes (e.g., the first nodes 11). However, these requests concern nodes 12, which are nodes that may or may not belong to the network 1. Such requests aim at changing statuses of the second nodes 12 with respect to the network 1. A single request may possibly concern a change of status of one or more nodes 12. For example, an external node 12 may request to join the network 1, as assumed in FIGS. 2 and 3. As another example, an internal node may request to leave the network 1, while it is part of the network 1. Such requests must be distinguished from requests of external clients 5, which cause the first nodes 11 to perform some work for the requesting clients 5.

Upon receiving S14 a request of change of status of a node 12, the reconfiguration service 2 informs S22 at least a subset of the first nodes 11 of the received request. In turn, the reconfiguration service 2 may obtain S40 an approval of the request from the nodes 11. Different approval mechanisms can be contemplated. In all cases, an approval means that at least a subset of the first nodes 11 collectively approve S30 the change of status, according to some pre-defined scheme. The approval results from contributions S34 of the first nodes, where such contributions are processed according to the consensus protocol 21 used by the network 1. That is, contributions S34 of the nodes 11 are coordinated via this consensus protocol. That is, the first nodes 11 are informed about and approve requests in a coordinated manner, in order to apply new configurations in a consistent way.

It is noted that the scenario contemplated above, the request is approved at step S40. However, the request may also be rejected. The nodes' contributions can be compared to votes: a sufficient number of nodes' contributions leads to an approval, whereas an insufficient number of contributions leads to a rejection.

In this way, the reconfiguration service 2 is able to continually update S45 the configuration log; this is performed according to request approvals as continually obtained S40 throughout steps of servicing the network 1. As a result, the reconfiguration service 2 is able to continually address S66 requests S64 of clients about configurations of the network, based on the updated configuration log.

According to aspects of the invention, the first nodes 11 can be informed S22 of the request by way of a publication. In that case, the reconfiguration service 2 makes the request available to the nodes 11, and the nodes access the published information. In that sense, "informing" means making some information available, without it being necessary to actively send such information to the first nodes 11. Optionally, though, the reconfiguration service 2 may directly send this information to the first nodes. Note, the above remarks hold for other, similar steps of information. All nodes 11 of the network may potentially be informed at step S22. However, in variants, this information may be made available only to nodes 11 having stakes in such requests, as in embodiments discussed later in detail. In all cases, at least a subset of the nodes 11 are informed S22.

The present solution enables a dynamic reconfiguration of the distributed system membership set while preventing long-range attacks. Clients 5 can adequately solicit the reconfiguration service 2 and safely obtain updated configuration information directly from the reconfiguration service 2, so as to mitigate or even prevent the risk of long-range attacks.

Embodiments of the invention will now be described in detail. The reconfiguration service 2 may advantageously be implemented as a distributed computing system 2, as shown in FIG. 1. The physical system 2 implementing the reconfiguration service 2 is preferably distinct from the client system 1. In variants, the reconfiguration service 2 may be run on the same physical machines 11 that compose the distributed system 1. In both cases, however, the reconfiguration service 2 adheres to a further consensus protocol 22 (e.g., based on a proof of work) that is logically distinct from the consensus protocol 21 used by the network 1 (e.g., based on a proof of stake). Thus, the reconfiguration service 2 may be implemented at the same distributed system 1 as the first nodes 11 or at a distinct distributed system 2. In other variants, the reconfiguration service 2 uses on a centralized solution, involving, e.g., a public key infrastructure, as known by those skilled in this field. According to aspects of the invention, the reconfiguration service 2 acts as a trusted entity for the network 1.

Moreover, additional trust may possibly be obtained by using several reconfiguration services 2 (not shown), interacting with clients 5, the nodes 12 and the network 1, for additional security. Analogously to the existence of multiple independent Domain Name System (DNS) services, the configuration of a single BFT system 1 can use multiple independent reconfiguration service instances. Upon reconfiguring, the BFT system 1 correspondingly updates S34 each of the reconfiguration services involved. A client 5 may, depending on its trust in those reconfiguration services, use any/all/a quorum of such services to learn about the configuration of the BFT system 1.

Trust can further be increased by using a hierarchical approach, in which the configuration of the reconfiguration service 2 is managed by a further configuration service 3, e.g., implemented as a further distributed system 3 running its own protocol 23, as shown in FIG. 1. That is, the reconfiguration service 2 may be a distributed computing system 2, the configuration of which can be managed by a further distributed computing system 3, where the latter may implement a reconfiguration method as described herein. So, the reconfiguration service 2 may be a consensus-based distributed system 2 and the configuration of the reconfiguration service 2 may possibly be managed by an additional reconfiguration service 3. According to aspects of the invention, a fixed-membership BFT system 2 can be used as a root service 2. Even proof of stake and dynamic-membership BFT systems can be used, as long as they can be considered trusted (e.g., due to their own configuration being registered in another reconfiguration service). Such a hierarchy can have arbitrary many levels and be rooted in a reliably discoverable system, e.g., a proof of work blockchain or static-membership BFT system.

In the following, the reconfiguration service 2 is assumed to be implemented at a distributed computing system 2 (distinct from the managed system 1), relying on a proof of work (PoW) consensus 22, whereas the consensus protocol 21 of the client network 1 is assumed to rely on a proof of stake (PoS) mechanism. The client system 1 may notably be configured as a permissioned blockchain, e.g., a dynamic permissioned blockchain. Note, the present methods may possibly be applied to PoW-based client networks. However, other algorithms are available for such networks, which may be leveraged to achieve the same, as noted in the background section.

The reconfiguration service 2 may for instance be implemented as a smart contract that is executed according to said further consensus protocol 22. A client 5 accessing the client system 1 is typically required to know its configuration (network addresses, keys, etc.). Now, it is advantageous to make the reconfiguration service 2 accessible without any prior knowledge about the identities of the nodes running it. Public PoW-based blockchain systems have this property. If the reconfiguration service 2 has the form of a smart contract (as in preferred embodiments), the identity of this smart contract can be considered the identity of the whole system 2, as it is the only information needed to bootstrap interaction with it. Note, in some cryptocurrency blockchains, the identity of the smart contract is the address of the smart contract.

According to aspects of the invention, a client 5 connecting to the system 1 may first reliably obtain an up-to-date configuration of the system 1 from the reconfiguration service 2. The client 5 may then submit its requests to the client system 1.

The approval obtained at step S40 (see FIGS. 2 and 3) by the reconfiguration service 2 may be based on a limited number of contributions, i.e., contributions made S34 by a subset of the first nodes 11 that have stakes in respect of the request of change of status. So, the contributions made S34 by the nodes 11 are processed by the reconfiguration service 2 according to such stakes.

The PoS blockchain systems reconfigure their validator sets through the process of "staking" and "destaking" funds in native cryptocurrency. To apply the reconfiguration service 2 to a PoS-based client 1, the reconfiguration service 2 stores the amount of stake associated with each validator (i.e. member) 11, in addition to or as part of the current configuration. Each validator's vote for a new configuration then has a weight proportional to the size of the corresponding stake.

The approval of a request may for instance be obtained S40 by validating this request as soon as a sufficient number of contributions are made S34 available to the reconfiguration service 2. So, the reconfiguration service 2 does not necessarily need to obtain all the contributions of the nodes 11. In addition, the reconfiguration service may impose a deadline and/or a quorum for the nodes 11 to vote.

As illustrated FIG. 2, the contributions made S34 by the nodes 11 are preferably obtained upon completion of the epoch during which the nodes 11 were informed S22 of the request. That is, the first nodes 11 are informed S22 by the reconfiguration service 2 of a request during a same epoch, such that the nodes may be able to contribute S34 their votes at an end of that same epoch. The approval of the request is, at the earliest, obtained S40 by the reconfiguration service 2 at the end of that same epoch for all nodes 11 involved. Doing so allows the nodes to vote based on same knowledge of the system.

Epochs can roughly be compared to time slices. However, they are not necessarily perfectly synchronous across the nodes 11. In the present context, an epoch typically corresponds to a certain number of sequence numbers of operations performed by each node (e.g., according to a same log of operations as locally replicated at each node). Still, because no configurational change will be agreed before a current epoch completes (at least not in respect of a request received during that same epoch), an epoch may also be defined as the time period between two successive configurational changes. So, a transition from one configuration to the other corresponds to the end of an epoch and the beginning of another epoch.

According to aspects of the invention, and as shown in FIG. 2 all participating nodes vote S34 at the end of an epoch during which they were informed S22 of the request. In variants, the nodes 11 may postpone their answers, such that the approval may be delayed. According to aspects of the invention, this occurs when the nodes 11 postpone their votes for batching purposes. In that case, the first nodes 11 may batch successive contributions in respect of successive requests of change of status, as informed S22 by the reconfiguration service 2 while continually servicing the network 1. That is, each participating node 11 may postpone one or more of its contributions and batch such contributions at a later stage. For example, the nodes 11 may send combined contributions to the server 2, once the number of changes in the network exceeds a given threshold or after a given time has lapsed.

As further seen in FIG. 2, the reconfiguration service 2 may, eventually, inform S47 the first nodes 11 of a configurational change of the network reflecting the most recently approved S40 change of status. That is, after the reconfiguration service 2 has obtained approval of a request, the reconfiguration service may inform S47 the nodes, for their records, and in view of subsequent operations. By so doing, the nodes 11 and the reconfiguration service 2 are able to maintain consistent views of the system configuration. Again, the nodes need not be explicitly notified the configurational changes; they may be passively informed.

The reconfiguration service 2 may advantageously implement a compensation mechanism. As illustrated in FIG. 2, the reconfiguration service 2 may notably request the second node 12 to provision S14 "credits" for the reconfiguration service 2 to be able to compensate S47 the first nodes 11. This compensation can be performed according to any suitable protocol 22 running at the reconfiguration service 2, i.e., a consensus protocol if the reconfiguration service 2 is a distributed computing system. The effective compensation of the participating nodes 11 may for instance occur as part of step S47, where the reconfiguration service 2 informs the nodes 11 of the obtained approval, in the interest of efficiency.

More sophisticated interactions between the nodes 11, 12 and the reconfiguration service 2 can be contemplated, as now discussed in reference to FIG. 3. As in FIG. 2, the sequence shown in FIG. 3 involves a reconfiguration service 2 that informs S22 a subset of nodes 11 of the network 1 upon receiving S14 a request of change of status of some node 12 with respect to the network 1. The request is again assumed to be a join request in this example. The reconfiguration service 2 then obtains S40 an approval of the request, based on contributions made S34 by the nodes 11 according to the consensus protocol 21 of the network 1. Moreover, the reconfiguration service updates S45 a configuration log according to request approvals obtained. This way, the reconfiguration service 2 can continually address client requests that require information about the configurations of the network 1 (not shown in FIG. 3).

In addition, a number of optional steps are involved. First, the requesting node 12 accesses S12 a latest configuration log of the reconfiguration service 2, based on which the node 12 registers S14 a request of change of status with the service 2. This way, the reconfiguration service 2 may subsequently inform S22 the nodes 11 of the request. In addition, the node 12 announces S16 this request to the nodes 11, such that the latter may subsequently perform verifications. The preliminary announce S16 allows the nodes 11 to compare this announce with the request as subsequently received S22 from the reconfiguration service 2. This way, the nodes 11 may subsequently acknowledge S24 (and thereby confirm) the request to the second node 12 if the announce S16 of the second node matches the request received S22 from the reconfiguration service. Note, in the specific example of FIG. 3, the confirmation S24 may be necessary for the node 12 to make a valid join request.

As further seen in FIG. 3, the second node 12 may, upon obtaining S24 the acknowledgment from the nodes 11, confirm S26 the request to the nodes 11 for the latter to start making S34 their contributions. The confirmation sent at step S24 is a verification of the correctness of the join request; the request as informed S22 by the reconfiguration service 2 can be (co-)related with the subsequent confirmation S26 from the second node 12. This makes it possible for the first nodes 11 to make sure that the second node 12 is acting as expected.

As also seen in FIG. 3, the first nodes 11 may, in addition to sending S34 contributions (or somehow make them available) to the reconfiguration service 2, directly inform S32 the second node 12. That is, the node 12 may directly obtain S32 the approval of the request. This way, the second node 12 may directly start acting S50 with respect to the network according to the approved S32 request. In the example of FIG. 3, this means that the joining node 12 may start acting S50 as a node of the network 1. The join operation may advantageously include a proof of the approval as received from the first nodes 11, for better liveness guarantees. A checkpoint is created at step S36, which corresponds to the end of the epoch at which a sufficient number of contributions have been obtained S40 to validate the approval. From this moment on, the nodes 11, 12 may start using the new configuration $C_{k+1}$, as also updated at the reconfiguration service 2 at step S45.

Although the examples of FIGS. 2 and 3 assumes a join request, the request as received at step S14 may similarly be a request to leave the network. In that case, the request may be formulated by the leaving node itself. In other cases, the request may be a request to evict one or more of the nodes 11 of the network 1, which is typically formulated by the remaining nodes. More generally, such requests may concern a change of status of any node (internal or external) with respect to the network 1. This change of status normally concerns a change of a quality or a property of a node (e.g., becoming idle), having less available memory or fewer computational resources.

According to another aspect, the invention can be embodied as a computer program product for managing reconfigurations of a distributed computing system 1 as described above. In such cases, a computer program product includes a computer readable storage medium having program instructions embodied therewith. Such program instructions are executable by processing means 105, such as processors of a computerized unit 101 shown in FIG. 4, to cause a reconfiguration service to implement steps as described above in reference to the present methods. Aspects of such computer program products are described in detail in section 3.2

The above embodiments have been succinctly described in reference to the accompanying drawings and may accommodate a number of variants. Several combinations of the above features may be contemplated. Examples are given in the next section.

2. Specific Embodiments

2.1 Particularly Preferred Embodiments

The following proposes a general decentralized solution for secure and dynamic reconfiguration for blockchain and BFT distributed systems. First, a reconfiguration service 2 is relied on, i.e., a Blockchain/BFT Membership Service for permissioned blockchains and BFT systems, which is designed to prevent attacks, such as "I still work here" attacks, by leveraging a (root) reconfiguration service implemented as a smart-contract on a public permissionless PoW blockchain. Members (or potential members) of the BFT distributed system 1 push membership updates to the reconfiguration service 2; the new membership is accepted and published by the reconfiguration service once a qualified number of nodes of the reconfigured system approve (vote for) the change. The reconfiguration service allows the new permissioned blockchain nodes to pay fees for joining and leaving the system. These fees are distributed among voting nodes to cover the cost of pushing membership updates to the reconfiguration service and create incentives for protocol participation.

The reconfiguration service can, for instance, be implemented as a smart-contract and be used with the Mir-BFT protocol known by those of skill in this filed. Such a reconfiguration service can be extended from permissioned to permissionless PoS blockchains to prevent long-range attacks; the reconfiguration service can considerably reduce the stake unbonding ("thawing") time.

2.2 Detailed Description of FIG. 2

In FIG. 2, an external node 12 sends S14 a join request to the reconfiguration service 2, which accordingly stores S20 the request. The reconfiguration service may for instance temporarily update a configuration log, in accordance with the join request. The requesting node 12 may altogether provision S14 credits, e.g., in view of compensating the nodes 11 of the client network 1. The reconfiguration service 2 accordingly informs S22 nodes 11 of the network 1, which start agreeing S30 on the join request (or not). The nodes 11 subsequently send S34 contributions, at the end of the epoch during which they were informed S22. A checkpoint is created at the end of the epoch during which the nodes agreed to the join request. From this moment on, the nodes 11 start using the configuration of the network 1. The reconfiguration service obtains S40 the approval by collecting the contributions S34 and validating them. If the join request is approved, the reconfiguration service updates S45 its configuration log and informs S47 the nodes 11 of the validated configuration. The reconfiguration service may, at the same time, take steps S47 to compensate the participating nodes, according to a protocol executed at the reconfiguration service.

The reconfiguration service concurrently manages requests received from external clients 5. Assume that a given client 5 loses connection at step S62. This client may later reconnect by soliciting S64 the reconfiguration service and thereby obtain S66 data as to the latest validated configuration of the network 1.

2.3 Detailed Description of FIG. 3

The sequences shown in FIG. 3 are essentially similar to those shown in FIG. 2, although it includes a number of intermediate steps, for additional security. In this example, interactions with external clients are not shown, for conciseness.

In FIG. 3, an external node 12 first reads S12 a current configuration of the network 1 (as previously stored S10 by the reconfiguration service) and subsequently registers S14 with the reconfiguration service 2, which accordingly stores S20 the request. The requesting node 12 may again provision S14 credits, in view of compensating the nodes 11. In addition to registering S14 with the reconfiguration service, the joining node 12 announces S16 itself to the nodes 11. The reconfiguration service informs S22 nodes 11 of the network 1 of the join request. In turn, the nodes 11 proceed S24 to a verification with the requesting node 12, which confirms the join request at step S26. At this point, the nodes 11 start to agree S30 on the join request (or not). The nodes 11 subsequently send S32, S34 their contributions to the requesting node 12 and the reconfiguration service 2; a checkpoint is created at step S36. From this moment on, the nodes 11 start using the new configuration of the network 1 and the requesting node 12 may start S50 participating in the network 1.

Meanwhile, the reconfiguration service obtains S40 the approval and updates S45 its configuration log, so as to be able to serve external client processes (not shown). That is, the configuration $C_k$ (as initially stored at step S10) transitions to configuration $C_{k+1}$ (as updated at step S45), which corresponds to configuration $C_k$ augmented by the joining node 12. In this example, the transfers of funds within the reconfiguration service 2 happen on processing S20 the "Register" transaction S14 (from the joining node's account to the reconfiguration service smart contract) and on updating S45 the stored configuration (from the smart contract to the accounts of nodes which have voted).

The example depicted in FIG. 3 assumes that all nodes have access to the state of the reconfiguration service 2. In some implementations of the reconfiguration service, each node may be assumed to run its own client (or use a proxy). All messages and requests may be authenticated using an appropriate authentication mechanism, e.g., public-key cryptography.

3. Technical Implementation Details

3.1 Computerized Units and Systems

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 4:
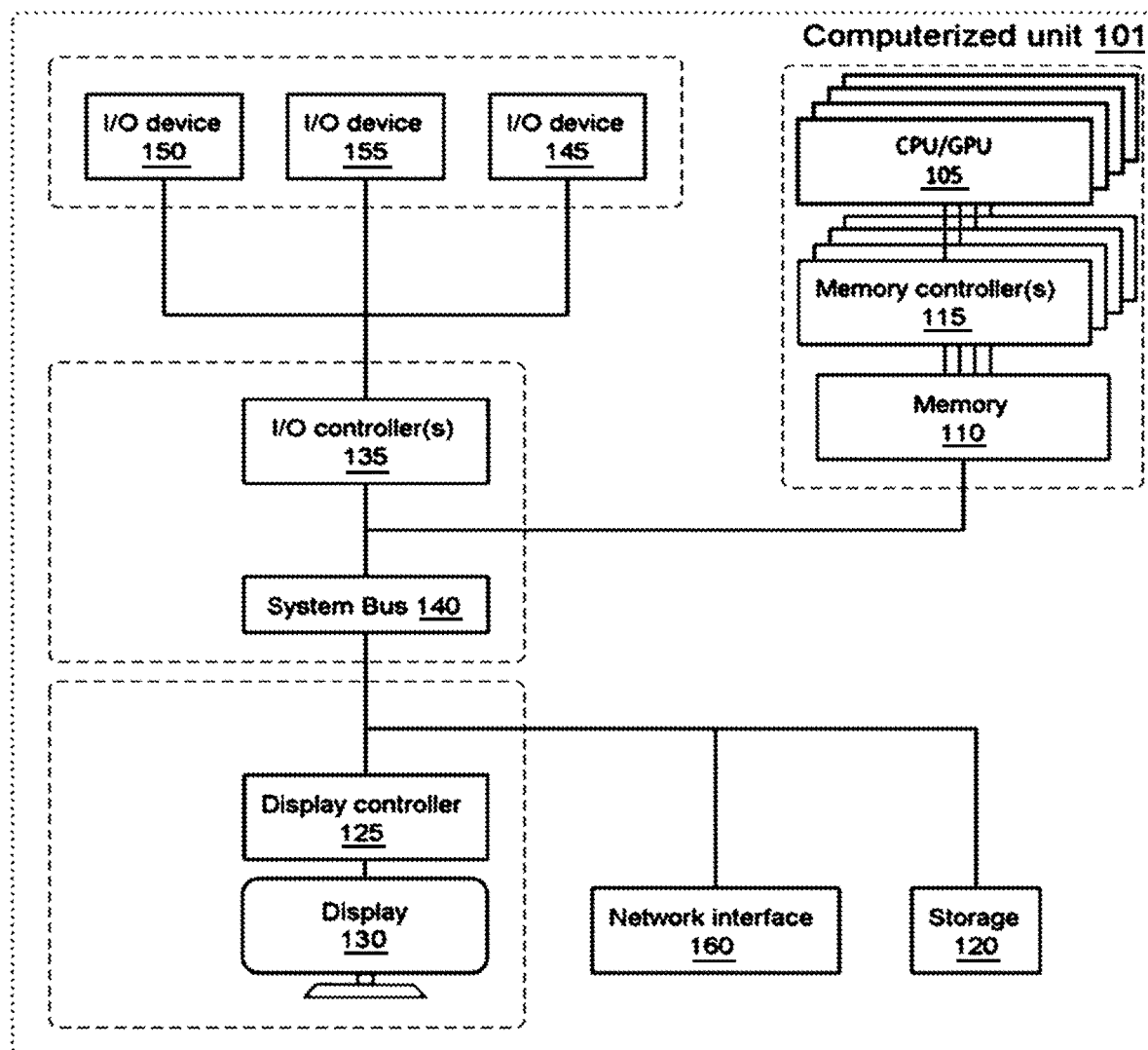
FIG. 4 schematically represents a general-purpose computerized unit, which may be used as a node of a distributed computing system, as in embodiments.

For instance, FIG. 4 schematically represents a computerized unit 101 (e.g., a general- or specific-purpose computer), which may possibly interact with other, similar units 101, to be able to perform steps according to the present methods.

In exemplary embodiments, in terms of hardware architecture, as shown in FIG. 4, each unit 101 includes at least one processor 105, and memory 110 coupled to a memory controller 115. Several processors (CPUs, and/or GPUs) may possibly be involved in each unit 101. To that aim, each CPU/GPU may be assigned a respective memory controller, as known by those of skill in this field.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media. External (i.e. secondary or auxiliary) storage 120 is normally available, which is not directly accessible by the processing means 105, as usual.

Software in memory 110 may include one or more separate programs, each of which includes executable instructions for implementing logical functions. In the example of FIG. 4, instructions loaded in the memory 110 may include instructions arising from the execution of the computerized methods described herein in accordance with exemplary embodiments. The memory 110 may further load a suitable operating system (OS). The OS essentially controls the execution of other computer programs or instructions and provides scheduling, input-output control, file and data management, memory management, and communication control and related services.

Possibly, a conventional keyboard and mouse can be coupled to the input/output controller 135. Other I/O devices 145, 150, 155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wi-Fi, WiMAX, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
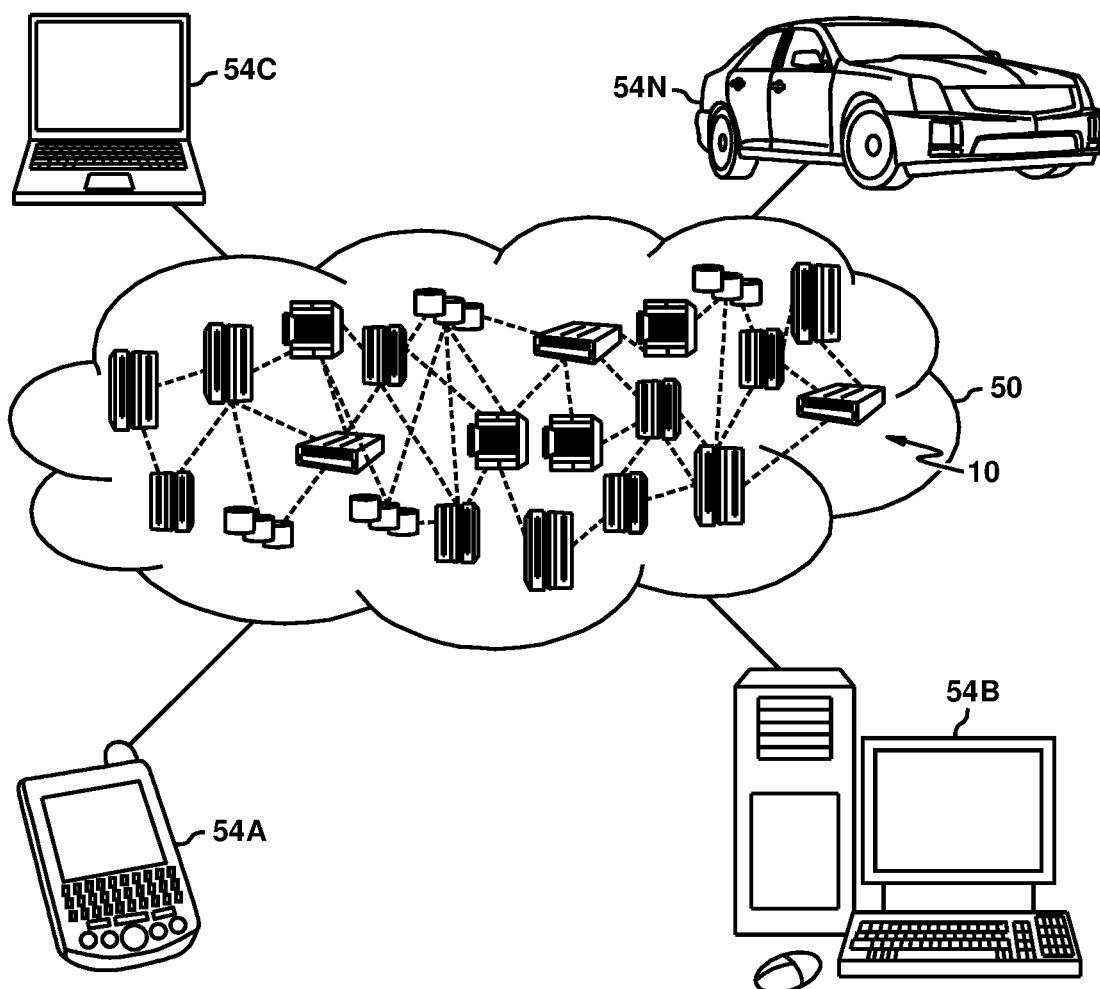
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
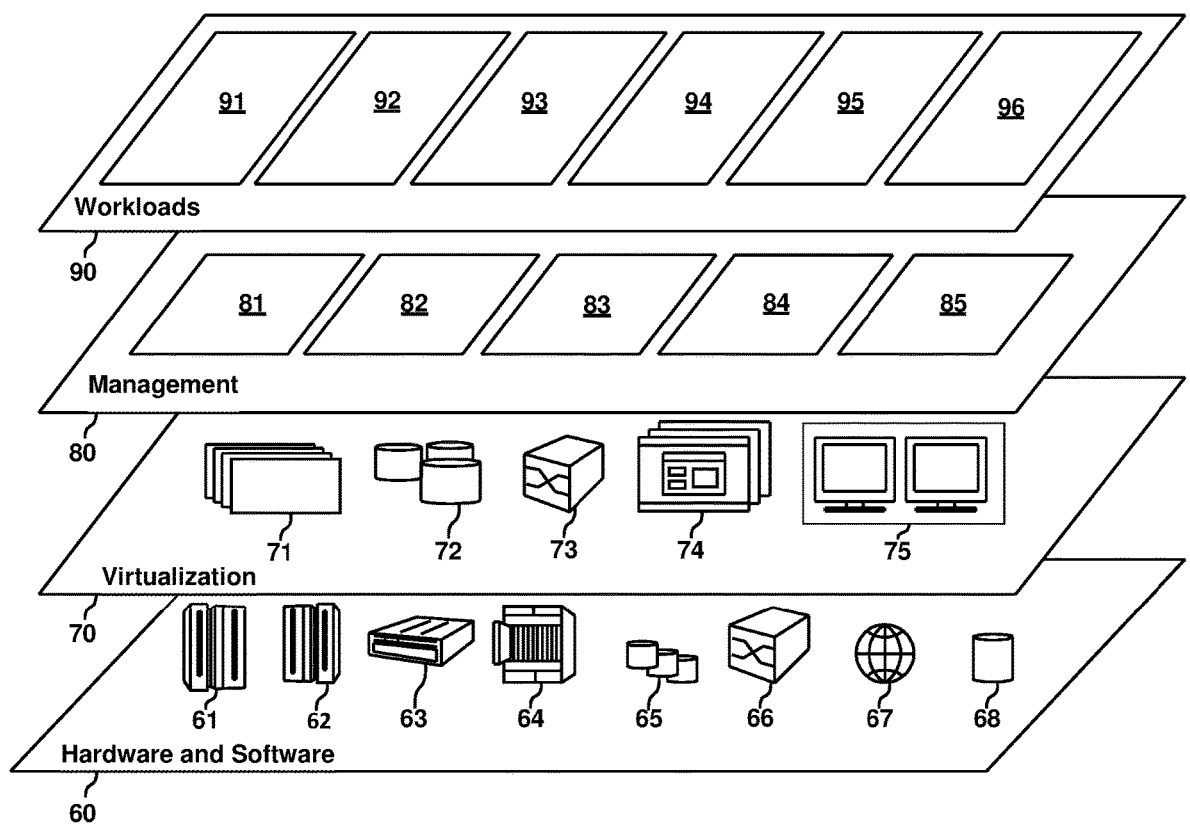
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing reconfigurations of distributed computing systems 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing reconfigurations of a Byzantine fault-tolerant, distributed computing system comprising a network of first nodes adhering to a given consensus protocol at a reconfiguration service, comprising:

servicing the network by;
receiving a request of change of status of a second node with respect to the network,
informing at least a subset of the first nodes of the received request, and
obtaining an approval of the request, whereby at least a subset of the first nodes collectively approve the change of status as a result of contributions processed according to the given consensus protocol;

updating a configuration log according to request approvals obtained by servicing the network; and addressing requests of clients about configurations of the network based on the updated configuration log.

2. The method according to claim 1, wherein the reconfiguration service is implemented at one of a distributed computing system and a distinct distributed computing system, and adheres to a further consensus protocol that is logically distinct from said given consensus protocol.

3. The method according to claim 2, wherein the reconfiguration service is implemented as a smart contract executed according to said further consensus protocol.

4. The method according to claim 2, wherein the reconfiguration service is implemented at the distinct distributed computing system.

5. The method according to claim 2, wherein the further consensus protocol uses a proof of work mechanism.

6. The method according to claim 1, wherein, at servicing the network, the given consensus protocol of the network uses a proof of stake mechanism, the approval is obtained by the reconfiguration service based on those contributions from a subset of the first nodes having stakes in respect of the request of change of status.

7. The method according to claim 1, wherein the distributed system is configured as a permissioned blockchain.

8. The method according to claim 1, wherein, at servicing the network, the first nodes are informed by the reconfiguration service of the received request during a same epoch, so as to be able to make said contributions at an end of that same epoch; and the approval of the request is obtained by the reconfiguration service at the earliest at the end of that same epoch.

9. The method according to claim 1, wherein, at servicing the network, the approval of the request is obtained at the reconfiguration service by validating the request when a sufficient number of said contributions are available to the reconfiguration service.

10. The method according to claim 1, wherein the method further comprises, at each of the first nodes, batching successive ones of their contributions in respect of successive requests of change of status as informed of by the reconfiguration service while servicing the network.

11. The method according to claim 1, wherein servicing the network further comprises:

informing the first nodes of a configurational change of the network reflecting the approved change of status.

12. The method according to claim 1, wherein the method further comprises, at the second node, obtaining a confirmation from the first nodes that they have been informed of the request of change of status; and confirming the request to the first nodes for the latter to start making said contributions based on the confirmed request.

13. The method according to claim 12, wherein the method further comprises:

obtaining said approval of the request at the second node, in addition to obtaining this approval at the reconfiguration service, for the second node to start acting with respect to the network according to the approved request.

14. The method according to claim 12, wherein the method further comprises, at the second node, sending the request of change of status to both the reconfiguration service and the first nodes, for the reconfiguration service to accordingly inform the first nodes and the first nodes to confirm they have been informed of the request and then start making said contributions.

15. The method according to claim 1, wherein the method further comprises, at the reconfiguration service, requesting the second node to provision credits for the reconfiguration service to compensate the first nodes according to a protocol run at the reconfiguration service.

16. The method according to claim 1, wherein a configuration of the reconfiguration service is managed by a further configuration service.

17. The method according to claim 1, wherein the received request is one of:

a request to join the network;

a request to leave the network; and a request to evict one or more of the nodes of the network.

18. The method according to claim 1, wherein the network comprises n nodes, n≥4, and the distributed computing system is configured to tolerate at most f Byzantine nodes, where f<n/3.

19. A system of managing reconfigurations of a Byzantine fault-tolerant, distributed computing system comprising a network of first nodes adhering to a given consensus protocol at a reconfiguration service, which comprises:

a computer system comprising a computer readable storage medium having program instructions embodied therewith, the program instructions executable by a computer to cause the computer to:

service the network by receiving a request of change of status of a second node with respect to the network, informing at least a subset of the first nodes of the received request, and obtaining an approval of the request, whereby at least a subset of the first nodes collectively approve the change of status as a result of contributions processed according to the given consensus protocol;

updating a configuration log according to request approvals obtained by servicing the network; and addressing requests of clients about configurations of the network based on the updated configuration log.

20. A computer program product for managing reconfigurations of a Byzantine fault-tolerant, distributed computing system comprising a network of first nodes adhering to a given consensus protocol, the computer program product comprising a computer readable storage medium having program instructions embodied therewith, the program instructions executable by one or more processors, to cause the reconfiguration service to:

service the network by receiving a request of change of status of a second node with respect to the network, informing at least a subset of the first nodes of the received request, and obtaining an approval of the request, whereby at least a subset of the first nodes collectively approve the change of status as a result of contributions processed according to the given consensus protocol;

update a configuration log according to request approvals obtained by continually servicing the network; and address requests of clients about configurations of the network based on the updated configuration log.

* * * * *